United States Patent [19]

Phillips et al.

[11] Patent Number: 5,683,210

[45] Date of Patent: Nov. 4, 1997

[54] MACHINE TOOL CHIP FLUSHING APPARATUS AND METHOD

[75] Inventors: William J. Phillips, Almont; Gary W. Oberliesen, Chesterfield, both of Mich.

[73] Assignee: Ford Global Technologies, Inc., Dearborn, Mich.

[21] Appl. No.: 506,712

[22] Filed: Jul. 26, 1995

[51] Int. Cl.$^6$ ............................... B23C 9/00; B08B 3/04
[52] U.S. Cl. ...................... 409/137; 29/DIG. 98; 134/32; 134/144; 239/227
[58] Field of Search .............. 409/137; 29/DIG. 88, 29/DIG. 98; 198/495; 239/227; 134/68, 70, 72, 32, 172, 33, 66; 118/2

[56] References Cited

U.S. PATENT DOCUMENTS

| 3,054,411 | 9/1962 | Randall | 409/137 X |
| 3,485,138 | 12/1969 | Staehle | 90/11 |
| 3,645,791 | 2/1972 | Sadwith | 134/33 |
| 4,151,808 | 5/1979 | Beck et al. | 118/2 |
| 4,778,315 | 10/1988 | Duffy et al. | 409/136 |
| 4,893,642 | 1/1990 | Parslow, Jr. et al. | 134/66 |
| 4,989,785 | 2/1991 | Walendowski | 239/227 |
| 5,078,256 | 1/1992 | Hatano et al. | 198/360 |
| 5,113,558 | 5/1992 | Soroka et al. | 29/57 |
| 5,205,686 | 4/1993 | de Caussin | 409/131 |
| 5,245,152 | 9/1993 | McCall | 219/69.14 |

FOREIGN PATENT DOCUMENTS

| 2630413 | 10/1989 | France | 198/495 |

Primary Examiner—William R. Briggs
Attorney, Agent, or Firm—Roger L. May; Joseph W. Malleck

[57] ABSTRACT

An apparatus and method are provided for washing machining debris from machined parts. The apparatus includes a machine transfer housing with front and rear sidewalls, a top, a bottom, an entrance sidewall defining an entrance, and an exit sidewall defining an exit. A transfer line enters the housing at the entrance, extends through the housing and exits the housing at the exit to transport the machined parts through the housing. A header is attached to the top housing wall for delivering a wash solution to the housing. A solenoid valve controls the flow of the wash solution in the header. One or more rotating nozzles are connected to the header for spraying the wash solution in the housing to remove machining debris from the machined parts and the housing walls. The method includes controlling the flow of the wash solution in the header and directing the wash solution through the rotating nozzles and spraying the wash solution in the housing and removing machining debris from the machined parts and the housing walls.

6 Claims, 2 Drawing Sheets

MACHINE TOOL CHIP FLUSHING APPARATUS AND METHOD

FIELD OF THE INVENTION

The present invention relates to a machine tool, and, more particularly, to and apparatus and method for removing chips and other debris from a machined component and the machine tool housing.

BACKGROUND OF THE INVENTION

A machine tool is used to manufacture components which require boring, cutting or other operations. Machining operations remove small pieces of the component to conform the component to desired dimensions. The machining process often creates chips and other debris which must be removed from the component. Typically, debris is removed by high pressure spraying of a wash solution through a nozzle attached to the top of the machine tool housing. Because a nozzle is capable of cleaning only debris in a direct line of flow of the spray, several nozzles are required to obtain adequate spray coverage. Inadequate spray coverage creates debris build-up which may cause misalignment of components or clamping of components off location creating variance which is unacceptable in a precision machining operation. Clamping components off location increases tool wear and machine down time. It is desirable to obtain complete spray coverage to remove chips and other debris from the machined components and the machine tool housing as well.

Another problem with current nozzles is that a nozzle is only capable of cleaning debris in a direct line of flow of the spray thereby requiring several nozzles to obtain adequate spray coverage to clean a component. Unfortunately, adding more manifolds of nozzles causes a pressure drop which decreases cleaning efficiency. Adding more nozzles therefore requires a larger pump to supply the required high pressure to each of the nozzles. Also, the manifolds and nozzles are obtrusive and hinder operators when changing tools. The nozzles are prone to inadvertent bending during tool changing and maintenance which decreases cleaning efficiency. Accordingly, it will be appreciated that it would be highly desirable to have a simple manifold and unobtrusive nozzles which effectively clean the components and housing without a pressure drop and without a need for a larger pump.

SUMMARY OF THE INVENTION

The present invention is directed to overcoming one or more of the problems set forth above. Briefly summarized, according to one aspect of the present invention, an apparatus for washing machining debris from machined parts comprises a housing having front and rear sidewalls, a top, a bottom, an entrance sidewall defining an entrance, and an exit sidewall defining an exit; a transfer line entering the housing at the entrance, extending through the housing and exiting the housing at the exit, the transfer line adapted to transport the machined parts through the housing; a header attached to one of the housing walls for delivering a wash solution to the housing; control means for controlling the flow of the wash solution in the header; and at least one rotating nozzle connected to the header for spraying the wash solution in the housing to remove machining debris from the machined parts and the housing walls.

According to another aspect of the invention, a method for washing machining debris from machined parts in a transfer station, wherein the transfer station has a housing with front and rear sidewalls, a top, a bottom, an entrance sidewall defining an entrance, an exit sidewall defining an exit, a transfer line entering the housing at the entrance and exiting the housing at the exit to transport the machined parts through the housing, and a header attached to one of the housing walls for delivering a wash solution to the housing, comprises the steps of controlling the flow of the wash solution in the header, and directing the wash solution through at least one rotating nozzle connected to the header and spraying the wash solution in the housing and removing machining debris from the machined parts and the housing walls.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
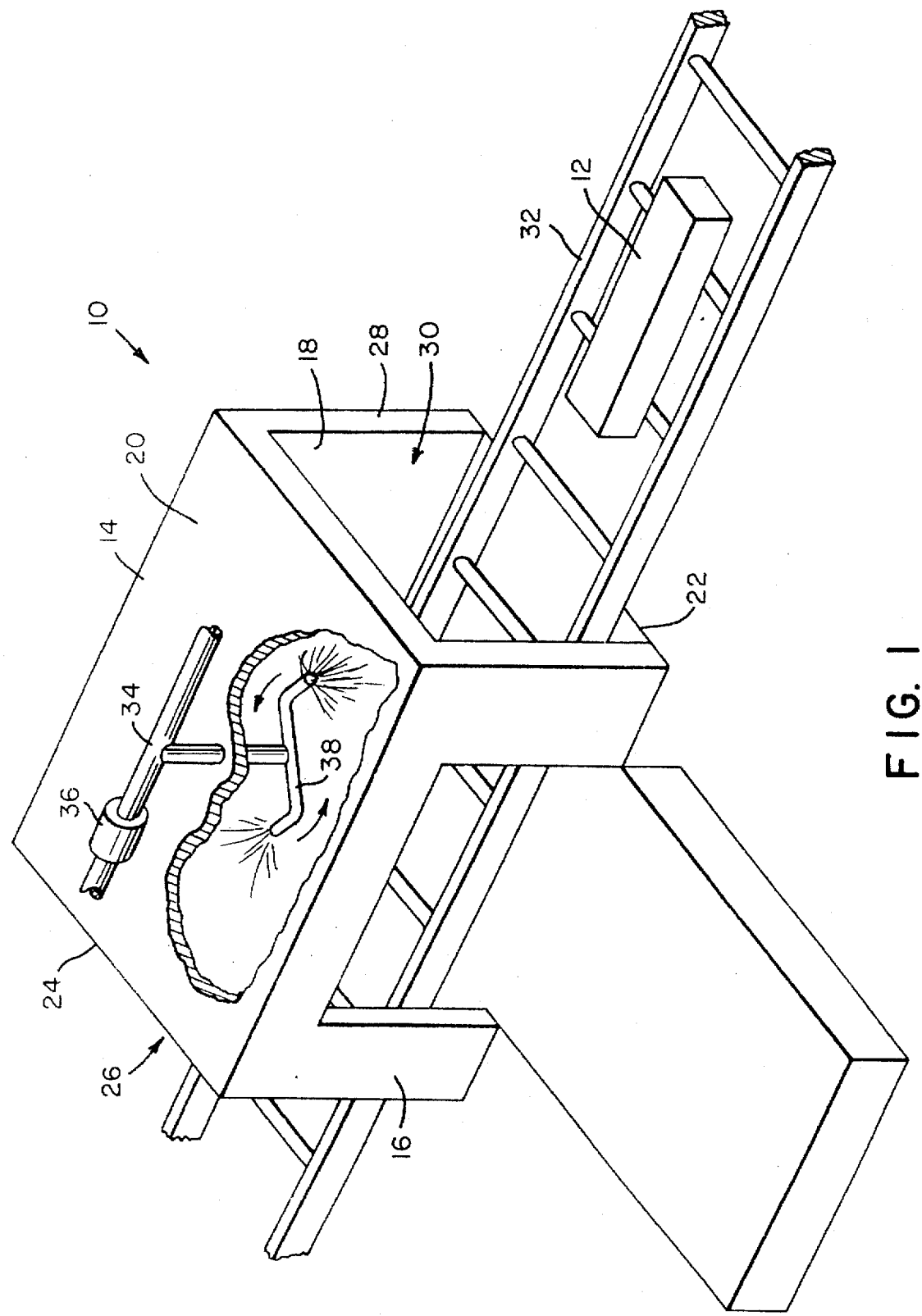
FIG. 1 is a perspective view of a preferred embodiment of a transfer machine incorporating a spray flush system according to the present invention.

Referring to FIG. 1, a machine tool, wash station or transfer station 10 washes metal chips and other debris from machined components 12 as the components move through the washing station 10. The wash station 10 includes a housing 14 with front and rear sidewalls 16, 18, a top wall 20, an open bottom 22, an entrance sidewall 24, and an exit sidewall 28. The entrance sidewall 24 defines an entrance 26 and the exit sidewall 28 defines an exit 30. The machined components 12 travel on a transfer line 32 which enters the housing 14 at the entrance 26, extends through the housing and exits the housing at the exit 30. The transfer line 32 may be a moving line whereon the machined components 12 are stationary relative to the transfer line, or the transfer line may be stationary with the machined components moving thereon.

A header manifold 34 delivers a wash solution to the housing 14 through one of the housing walls, preferably the top wall 20. A solenoid valve 36 controls the flow of wash solution from a pump (not shown) into the header 34.

At least one nozzle 38 is connected to the header 34 for delivering a spray of wash solution to remove the debris from the components 12. Typically, the housing is six to eight feet high and five feet wide with an open bottom positioned over a drainage trough. Depending on the machining operations performed and the size of the components, debris may collect on the sidewalls. Debris on the sidewalls can also be washed from the walls by the rotating nozzle into the drainage through. All the debris is flushed through the bottom 22 of the housing 14 into the drainage trough for removal.

Figure 2:
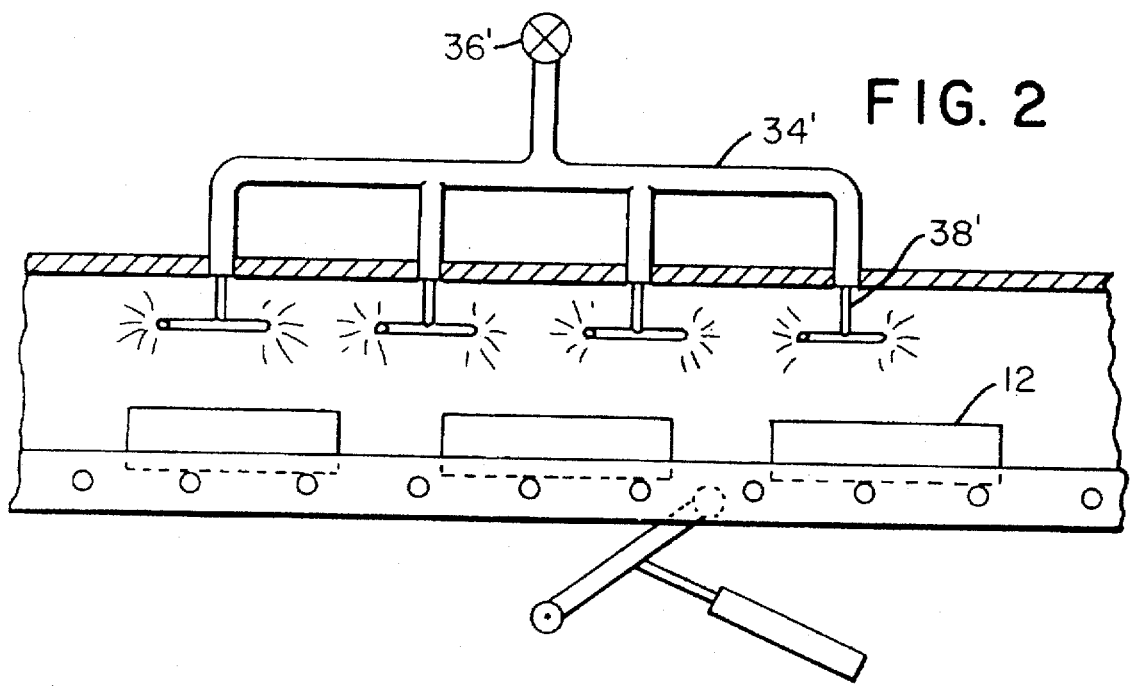
FIG. 2 is a diagrammatic side view of a spray flush system similar to FIG. 1, but illustrating another preferred embodiment.
Figure 3:
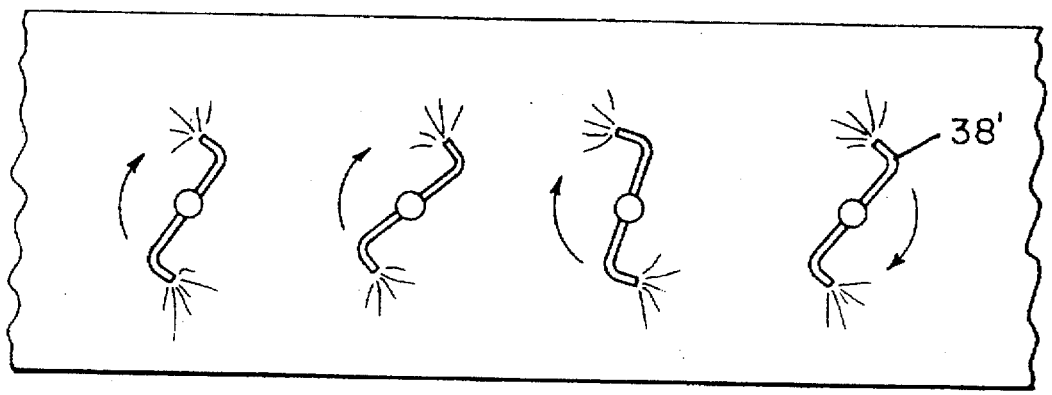
FIG. 3 is a diagrammatic top view of the spray flush system of FIG. 2.

Referring to FIGS. 2-3, the header 34' contains a plurality of rotating nozzles 38' appropriately spaced to provide a spray of wash solution to cover the interior of the housing.

Figure 4:
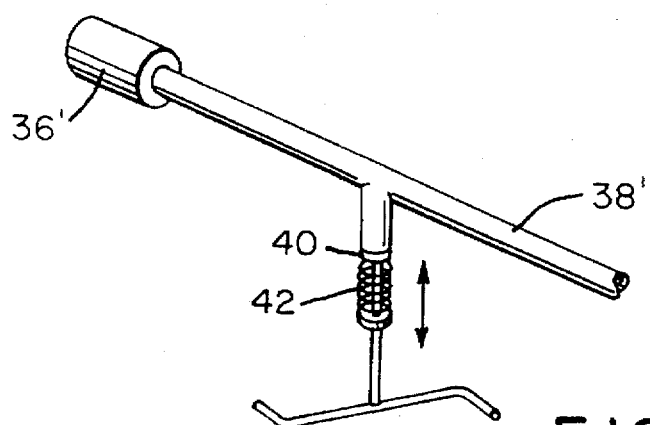
FIG. 4 is a somewhat more detailed view of one of the nozzles of FIG. 3.

Referring to FIG. 4, the nozzle 38' is connected to the header manifold 34' using a seal 40 to prevent leakage and a coiled return spring 42 which keeps the nozzle in a retracted position. The nozzle 38' extends against the force of the spring 42 in response to the pressure of the wash solution to bring the nozzle closer to the components. When the washing is completed, the pressure of the wash solution decreases and the spring 42 retracts the nozzle 38'.

Operation of the present invention is believed to be apparent from the foregoing description and drawings, but a few words will be added for emphasis. When the machining station is idle, such as during a food break, shift change or weekend, the solenoid valve can be operated to send the wash solution to the header manifold. From the header manifold, the solution flows to the nozzle which rotates as the solution is forced through it by the pump. The pressure of the solution acts against the coil spring to extend the nozzle closer to the area to be cleaned. Debris from the components and the housing walls exits through the open bottom. When washing is complete, the solenoid valve is shut off causing the pressure to drop in the header manifold which allows the coil spring to retract the nozzle. The rotating nozzle effectively cleans the components and housing without experiencing a pressure drop or requiting a larger pump because the nozzle extends so that it is closer to the area to be cleaned and fewer nozzles are require because of the rotating spray pattern.

It can now be appreciated that there has been presented an apparatus and method for washing debris from machined parts in a transfer station. The apparatus includes a housing with front and rear sidewalls, a top wall, a bottom, an entrance sidewall defining an entrance, and an exit sidewall defining an exit. A transfer line adapted to transport the machined parts through the housing enters the housing at the entrance, extends through the housing and exits the housing at the exit. A header manifold delivers a wash solution to the housing through one of the housing walls. A solenoid valve controls the flow of the wash solution in the header. A rotating nozzle connected to the header sprays the wash solution in the housing to remove machining debris from the machined parts and the housing walls as well.

The method for washing debris from machined parts in a transfer station includes controlling the flow of the wash solution in the header, connecting at least one rotatable nozzle to the header, directing the wash solution through at least one nozzle and rotating the nozzle, and spraying the wash solution in the housing and removing debris from the machined parts and the housing walls. The method also includes extending the nozzle from the header in response to fluid pressure of the wash solution in the header exceeding a preselected amount, and retracting the nozzle towards the header in response to fluid pressure of the wash solution in the header falling below a preselected amount.

While the invention has been described with particular reference to the preferred embodiments, it is apparent that the extendible rotating nozzle is easily adapted to other cleaning and wetting uses. As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An apparatus for washing debris from machined parts, comprising:

a housing having front and rear sidewalls, a top wall, a bottom, an entrance sidewall defining an entrance, and an exit sidewall defining an exit;

a transfer line entering said housing at said entrance, extending through said housing and exiting said housing at said exit, said transfer line adapted to transport said machined parts through Said housing;

a header for delivering a wash solution to said housing through one of said housing walls;

control means for, controlling the, flow of said wash solution in said header; and at least one rotating nozzle connected to said header for spraying said wash solution in Said housing to remove machining debris from said machined parts and said housing walls, said nozzle extending from said header in response to fluid pressure of said wash solution in said header exceeding a preselected amount and retracting towards said header in response to fluid pressure of said wash solution in said header falling below a preselected amount.

2. An apparatus, as set forth in claim 1, wherein said header is attached said top wall and said debris is washed to said bottom for removal.

3. An apparatus, as set forth in claim 1, wherein said nozzle is spring loaded.

4. A method for washing debris from machined parts in a transfer station, said transfer station having a housing with front and rear sidewalls, a top wall, a bottom, an entrance sidewall defining an entrance, an exit sidewall defining an exit, a transfer line entering said housing at said entrance and exiting said housing at said exit to transport said machined parts through said housing, and a header for delivering a wash solution to said housing through one of said housing walls, said method comprising the Steps of;

controlling the flow of said wash solution in said header;

connecting at least one rotatable nozzle to said header;

directing said wash solution through said nozzle and rotating said nozzle;

spraying said wash solution in said housing and removing debris from said machined parts and said housing walls; and extending said nozzle from said header in response to fluid pressure of said wash solution in said header exceeding a preselected amount, and retracting said nozzle towards said header in response to fluid pressure of said wash solution in said header falling below a preselected amount.

5. A method, as set forth in claim 4, including spring loading said nozzle.

6. A method, as set forth in claim 4, including washing said debris to said bottom of said housing for removal.

* * * * *